United States Patent [19]
Johansson

[11] Patent Number: 4,793,065
[45] Date of Patent: Dec. 27, 1988

[54] CIRCULAR SAW WITH ANNULAR SAW BLADE

[75] Inventor: Mats Johansson, Forshaga, Sweden

[73] Assignee: Electrolux Motor Aktiebolag, Huskvarna, Sweden

[21] Appl. No.: 105,589

[22] Filed: Oct. 8, 1987

[30] Foreign Application Priority Data

Oct. 22, 1986 [SE] Sweden .................................. 8604487

[51] Int. Cl.$^4$ .............................................. B27B 5/14
[52] U.S. Cl. ...................................... 30/389; 30/347; 51/168
[58] Field of Search ......................... 30/388, 389, 347; 51/73 R, 168; 83/676

[56] References Cited

U.S. PATENT DOCUMENTS 2,972,363  2/1961  Santilli .................................. 30/389
4,352,241  10/1982  Johansson ............................. 30/389

FOREIGN PATENT DOCUMENTS 60971  9/1982  European Pat. Off. .

Primary Examiner—Douglas D. Watts
Attorney, Agent, or Firm—Armstrong, Nikaido, Marmelstein, Kubovcik

[57] ABSTRACT

In an annular saw force-exerting mechanism (56, 57) is provided so as to act on flange-equipped support rollers (40, 41) for the saw blade (8). The support rollers have at least one flange (44) engaging a groove in the web portion of the saw blade. The force-exerting mechanism acts essentially only in the axial direction of the support rollers essentially parallel to the plane of symmetry of the saw blade towards the centre of the saw blade. Alternatively, force-exerting mechanism is provided so as to act on a drive pulley for the saw blade essentially only in a direction perpendicular to the axis of rotation of the drive pulley, parallel to the plane of symmetry of the saw blade outwards from the centre of the saw blade. In both cases the drive surfaces (22, 38) of the drive pulley and the saw blade are pressed against each other, and the inner edge of the flange on the support rollers is pressed against the inner edge of the groove in the web portion of the saw blade.

4 Claims, 4 Drawing Sheets

CIRCULAR SAW WITH ANNULAR SAW BLADE

TECHNICAL FIELD

The invention relates to a circular saw with an annular blade, known as an annular saw, with an imaginary centre axis and a power unit comprising a motor housing with motor, elements to hold the saw blade in place in the power unit and a transmission system to transmit the motor drive moment to the saw blade, with the saw blade having a plane of symmetry substantially perpendicular to the imaginary centre axis. More precisely the invention relates to an annular saw where the saw blade has an inner rim section with first drive surfaces, an outer rim section with a cutting system (in which concept saw teeth are included as well as other material-cutting devices such as diamond inserts, etc.) and between them a web portion exhibiting a smooth underside and a smooth topside, and these sides are parallel to the said plane of symmetry, besides which at least one annular groove is provided in at least one of the aforementioned sides, and with the said holding elements including at least two lower support rollers, each one with a surface of rotation bearing upon the smooth underside and at least two upper support rollers with a surface of rotation bearing upon the smooth topside of web portion of the saw blade, and also on at least two of the said lower and upper support rollers at least one flange which is limited in the axial direction of the roller by an annular outer flange edge and an annular inner flange edge, said flange having a flange thickness which is less than the width of the groove in the web portion of the saw blade and a flange height which is less than the depth of the groove in which the flange is fitted, said transmission system comprising on the one hand a drive pulley fitted substantially on the inside of the inner rim of the saw blade with an axis of rotation located between the inner rim of the saw blade and the said centre axis, parallel to the centre axis, and on the other hand transmission means to transmit the motor torque to the drive pulley, which drive pulley comprises second drive surfaces linking with the said first drive surfaces on the inner rim section of the saw blade so as to transmit, on rotation of the drive pulley, the torque of the drive pulley to the saw blade through a friction coupling between the said first and second drive surfaces so that this rotates around its imaginary centre axis.

BACKGROUND ART

Annular saws have been known for more than a hundred years. In relation to conventional circular saws they have, however, till now had little importance. The fitting of an annular circular saw in the power unit and also the driving of it require considerably more advanced technical solutions than the fitting and driving of a conventional circular saw. It can be said that there are two main principles for how an annular saw blade must be fitted and driven. One principle is based on the fact that one has both drive rollers and support rollers working on the web portion of the saw blade. The drive rollers can either work through gear drive in a cut-out in the saw blade or through friction drive, which is more usual and to be preferred to gears working under hard, wearing conditions. In order that such friction drive shall function properly, the drive rollers must be pressed very strongly against the body of the saw blade. This leads to severe heating of the saw blade so that the latter buckles. Annular saws with drive rollers which work through friction coupling against the body of the saw blade are described for example in U.S. Pat. Nos. 3,930,310 and 4,316,328.

An annular saw according to the second principle with drive against the inner rim of the saw blade is described in U.S. Pat. No. 4,472,880. The annular saw according to this patent is, in relation to earlier proposed designs, an important technical achievement. Through this design for the first time an annular saw has obtained a significant technical application. The design is, however, not completely without disadvantages. In order that a safe friction coupling may occur between the drive surfaces on the two drive pulleys which form part of the drive system and which are pressed in opposite directions towards each other at right angles to the plane of symmetry of the saw blade so that the rim section of the saw blade is gripped between the drive pulleys, the pressing force must be very great. This entails that the rim section is severely heated. Certainly this does not bring about the buckling of the saw blade, expecially as the design permits the saw blade to be cooled with cooling liquid, but it entails a not inconsiderable loss of energy, so that the drive effect is considerably impaired.

DISCLOSURE OF THE INVENTION

A first aim of the invention is to improve the degree of efficiency in the type of annular saw that is described in U.S. Pat. No. 4,472,880.

A second aim is to offer a power transmission with very high functional safety and which has a comparatively simple construction and which is therefore relatively simple and cheap to produce.

These and other aims can be achieved through a saw of the type described in the preamble being characterised by the fact that either force-exerting members are provided to work on the support rollers which have at least one flange in engagement with a groove in the web portion of the saw blade, said force-exerting members working essentially on the axial direction of the support rollers, parallel to the plane of symmetry of the saw blade, towards the centre of the saw blade, or that force-exerting members provided to work on the drive pulley essentially only in a direction perpendicular to the axis of rotation of the drive pulley, parallel to the plane of symmetry of the saw blade outwards from the centre of the saw blade, so that the said first and second drive surfaces are pressed against each other and so that the said inner edge of the flange on the said flange on the support rollers is pressed against said inner edge in said groove in the web portion of the saw blade.

The saw blade preferably has the design which is described in U.S. Pat. No. 4,472,880 and U.S.A. (patent pending application Ser. No. 604,935), i.e. having an inner rim section with symmetrically bevelled rim portions which form an angle of between 2° and 15°, preferably between 3° and 10°, with the plane of symmetry, said bevelled surfaces constituting the said first drive surfaces. According to the later patent the web portion of the saw blade is provided with only a single annular groove on one side, while the other side is without such groove. This feature also constitutes a preferred feature of the present invention. This groove is further provided in the manner which is known through these two patents so as to work in conjunction with two support rollers provided with flanges.

The drive pulley is preferably formed in one piece with a milled out wedge shaped groove, the sides of which have the same angle of slope as the bevelled surfaces on the inner rim section of the saw blade, said sides forming the said second drive surfaces. The drive pulley can also be formed of two drive pulleys, which are joined to each other or working in conjunction with each other so as to form an integrated unit, which is here included in the concept "drive pulley", in spite of the fact that this drive pulley in itself can be formed of two or more elements.

Other embodiments than the abovementioned can, however, be considered. Instead of fitting a pair of first drive surfaces, which form bevelled surfaces which slope inwards at a small angle towards the plane of symmetry of the saw blade and towards the centre of it, it is possible to design the first drive surfaces as sidesin a wedge-shaped groove in the inner rim portion of the saw blade. The drive pulley in this case is provided with a flange formed in the corresponding manner with bevelled surfaces, which form the said second drive surfaces.

The said force-exerting members, which form part of the characterising element in the invention, can be made of screw and nut elements arranged to press in an axial direction against the support rollers provided with a flange, preferably via spring elements.

Further characteristics and aspects of and andvantages of the invention will be made apparent from the following claims and also by the following description of preferred embodiments of the invention.

BRIEF DESCRIPTION OF DRAWINGS

In the following description of the preferred embodiments, reference will be made to the enclosed figures, on which FIG. 1 constitutes a perspective view of an annular saw according to a first embodiment of the invention.

DESCRIPTION OF PREFERRED EMBODIMENTS

Figure 1:
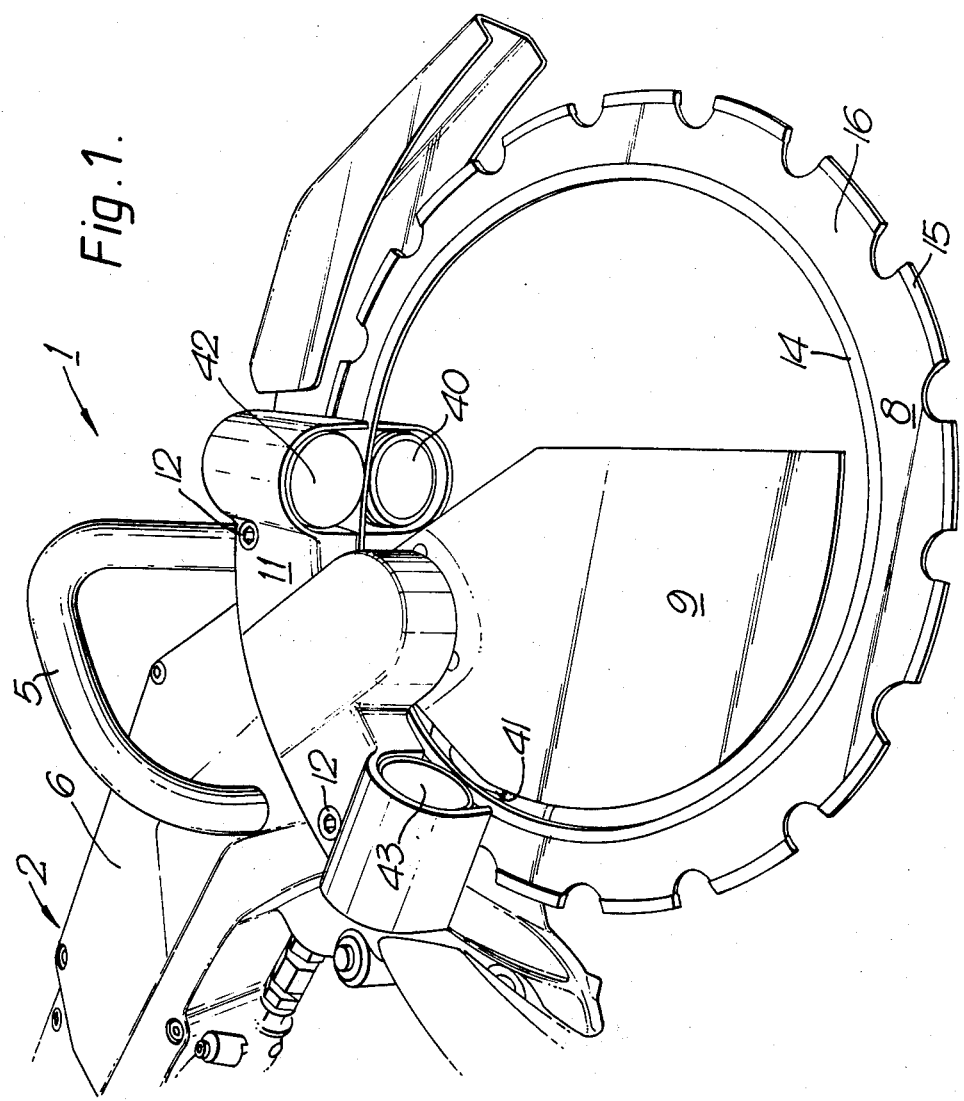
Figure 2:
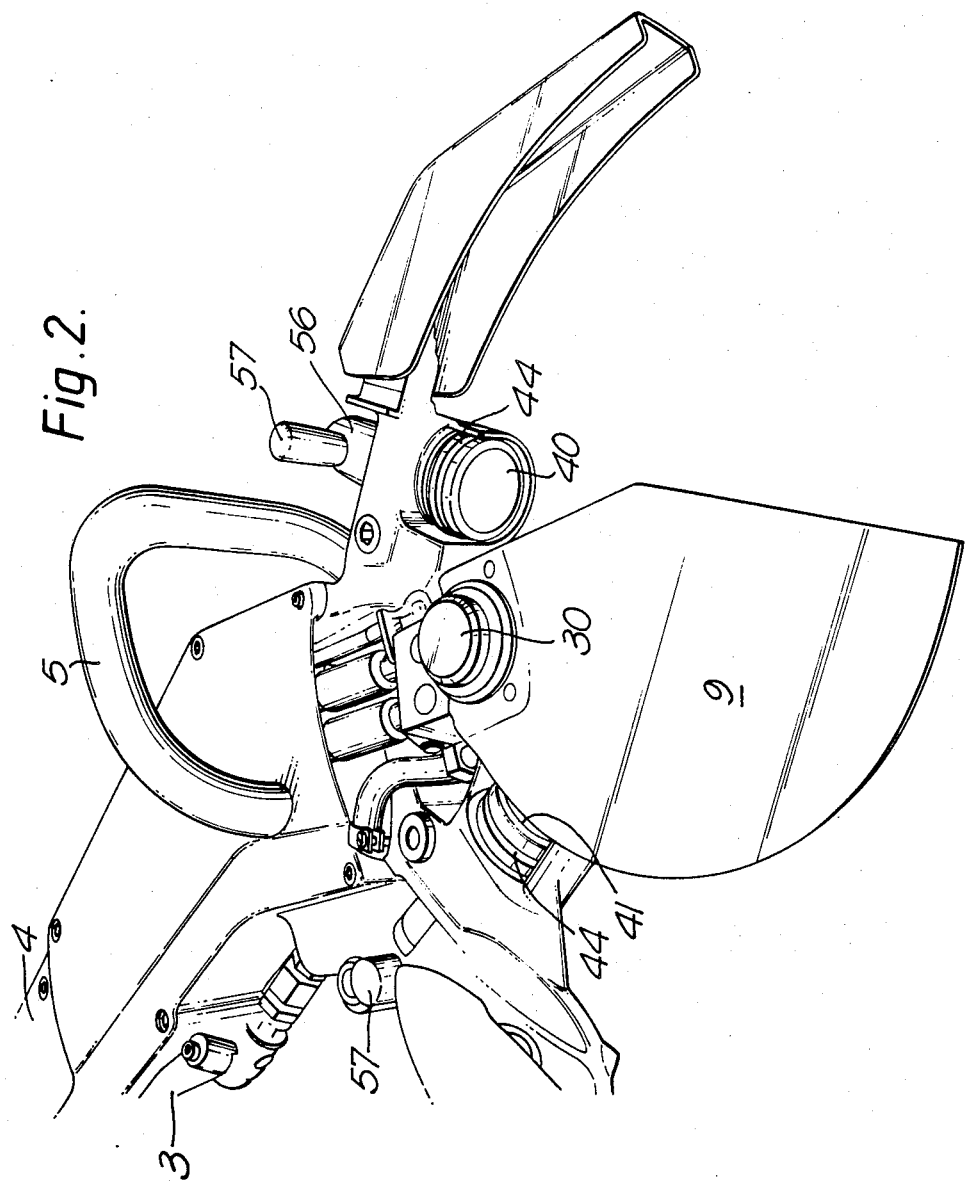
FIG. 2 shows the same saw with the saw blade and certain holding devices removed, FIG. 3 constitutes a section III—III in FIG. 2 and shows, partly schematically, the saw blade and also certain elements characteristic of the invention, with certain parts being left out so that what is essential for the invention may be better shown, FIG. 4 constitutes a section IV—IV in FIG. 3.
Figure 3:
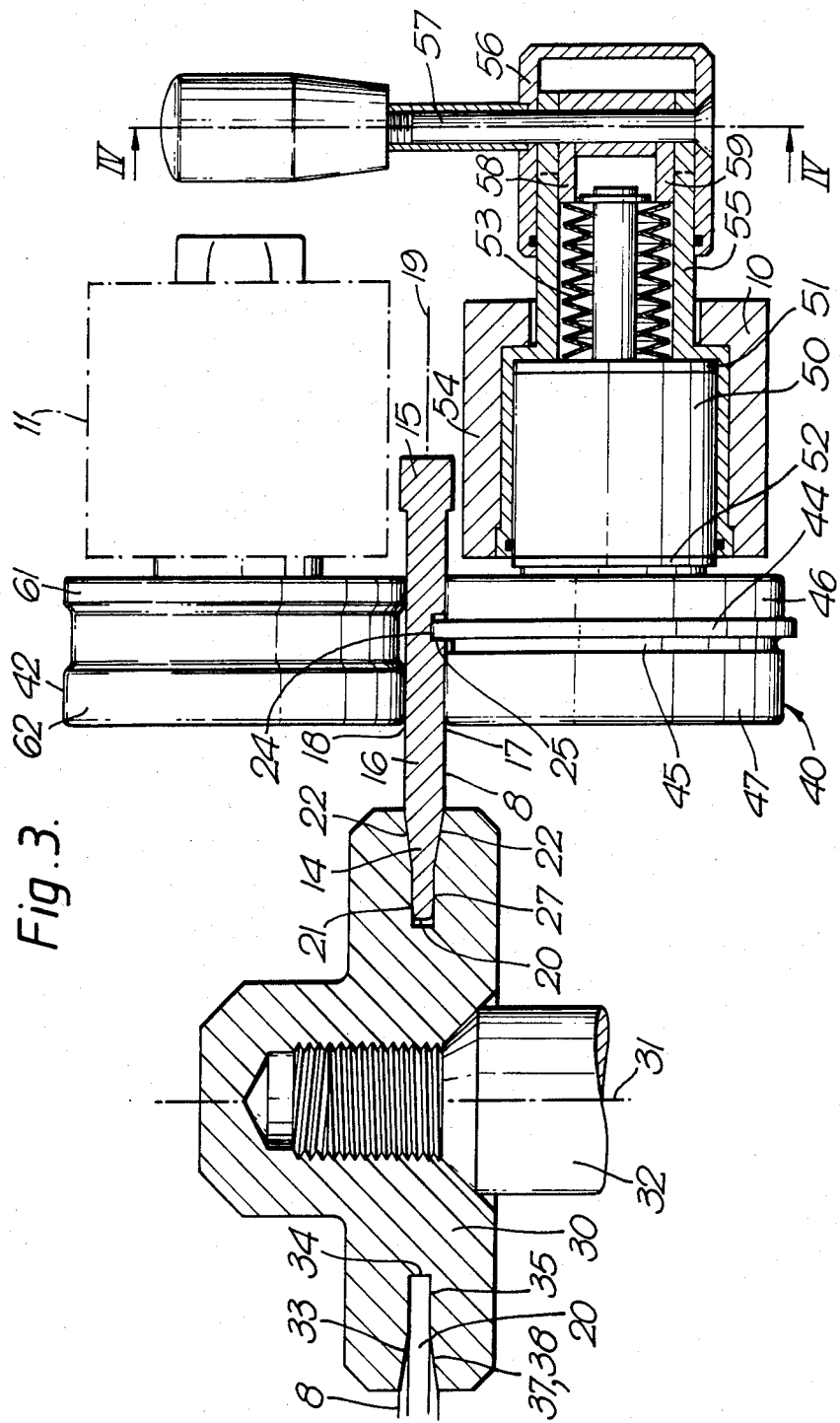
Figure 4:
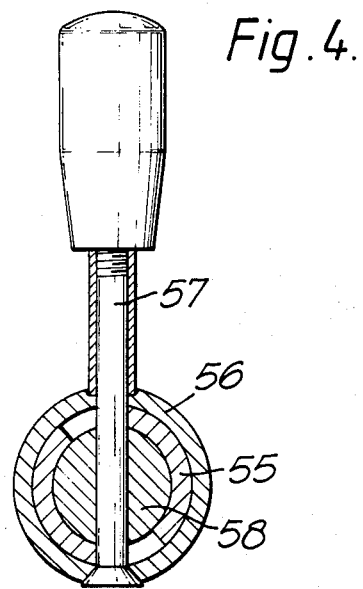
Figure 5:
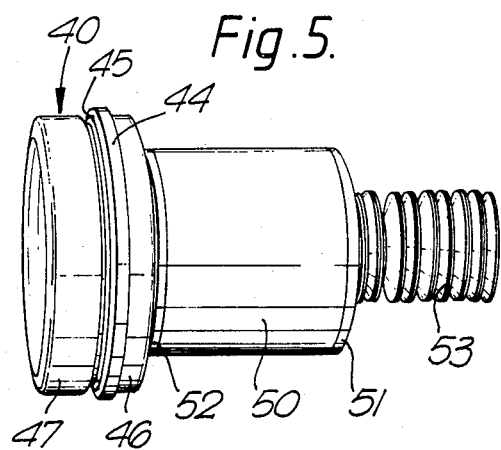
FIG. 5 shows in greater detail a perspective view of a machine unit in FIG. 3.

Referring first to FIG. 1-3 a machine unit of a hydraulically driven annular saw 1 is generally designated 2. The unit 2 comprises a motor housing 6 with a hydraulic motor which is not shown. The hydraulic conduits to the motor have been designated 3. Handles on the machine unit 2 have been designated 4 and 5. The machine unit 2 also includes elements for holding an annular saw blade 8 in place in the machine unit and also a transmission system to transmit to the saw blade 8 the drive power of the motor. A central disc has been designated 9. Part of the machine unit 2 is a base plate 10 and also a cover 11, which is mounted on the base plate 10 by means of screws 12, so that the cover 11 with the support elements for the saw blade 8 fitted in it can be removed when the saw blade 8 is to be fitted or replaced.

The annular saw blade 8 has an inner rim portion 14, an outer rim portion 15, which is provided with cutting elements in the shape of diamond tipped sectors, and also between the rim sections a web portion 16 with a smooth underside 17 and a smooth topside 18. The sides 17 and 18 are parallel to each other and to a plane of symmetry 19 of the saw blade 8. The inner rim portion 14 of the saw blade 8 consists, going in an outward direction, of a rounded edge 20, after that a couple of flat, parallel edge zones 21 and between the edge zones 21 and the web portion 16 a pair of bevelled surfaces 22, which form the system's first drive surfaces mentioned in the preamble. A groove in the smooth underside 17 of the saw blade 8 has been designated 24. This groove has a width B and a depth D. An inner edge of the groove 24, said edge being straight, i.e. perpendicular to the plane of symmetry 19, has been designated 25.

A drive pulley on the saw blade has been designated 30. This is fitted mainly inside the annulus of the saw blade 8. It is arranged so as to be able to rotate around an axis of rotation 31, which is parallel to the imaginary centre axis of the saw blade 8. A drive axle has been designated 32, FIG. 3. Other powder transmission devices for transmission of the drive moment of the motor to the drive pulley 30 have not been shown. These elements can be conventionally designed. For example elements of the type that is shown in U.S. Pat. No. 4,472,880 can be included.

In the drive pulley 30 there is located an annular, partly wedge-shaped groove 33, which is somewhat deeper than the width of the inner rim portion 14 of the saw blade 8. The groove 33 has a straight bottom 34 and thereafter follows an inner zone 35 with smooth parallel walls 36. The distance between the parallel walls 36, i.e. the width of the inner zone 35 in the axial direction of the pulley is the same as the thickness of the saw blade 8 in the area of its edge zones 21. The groove 33 is terminated by an outer zone 37, in which the groove widens at an angle corresponding to the angle of taper in the bevelled surfaces 22 on the saw blade 8. These outer beveled surfaces 38 in the groove 33 form the said second drive surfaces of the device.

In the base plate 10 there are journalled a pair of lower running rollers 40 and 41 and in the cover 11 there are journalled a pair of upper running rollers 42 and 43. Each one of the lower running rollers 40 and 41 is provided with a flange 44 with an inner edge 45 and on opposite sides of the flange 44 a pair of rotation surfaces 46 and 47. The flange 44 has a width b and a height h which are less than the width B and the depth D of the groove 24 in the saw blade 8. The flange 44 is fitted in the groove 24 in a manner known per se, while the support rollers 40, 41 support the saw blade 8 from underneath with the rotation surfaces 46, 47 running against the smooth underside 17 of the saw blade on opposite sides of the groove 24.

An axle journal on each of the lower support rollers 40, 41 is mounted in a ball bearing unit inside a bush 50 with end rings 51 and 52. Outside the outer end ring 52 there is a set of springs 53. The bush 50 with the said ball bearings is mounted in a bearing housing 54 in the base plate 10, while the set of springs 53 is mounted in a tubular backwards-projecting sleeve 55. This is fitted on the outside with a thread with very large pitch working in conjunction with a corresponding pitch on the inside of a sleeve nut 56 on the outside of the sleeve 55. The sleeve nut 56 is arranged so as to be able to turn a quarter of a revolution with the aid of a lever 57. The sleeve nut 56 is linked via the inner section of the lever 57 with a plunger 58, whose inner annular section 59 bears against the set of springs 53. Through turning the lever 57 a quarter of a turn the sleeve nut 56 is displaced inwards towards the base plate 10, at which the springs in the set 53 are tensioned, so that they in their turn develop a force in an axial direction against the bush 50 and therewith against the lower support roller 40 in its axial direction. The two lower support rollers 40 and 41 are identically equipped with force-exerting devices of the type described.

The upper support rollers 42 and 43 are mounted in the same way as the lower support rollers 40 and 41, but are not fitted with any force-exerting system. The rotation surfaces on the upper support rollers 42, 43 have been designated 61, 62.

In operation, the set of springs 53 is tensioned with the aid of the sleeve nut 56 and the thread on the sleeve 55 working in conjunction with the sleeve nut. Instead of threads one of the elements 55 and 56 can also be fitted with a guiding groove and the second element with a guide pin or similar, working in conjunction with said groove, which gives the same pattern of movement as threads working in conjunction. The set of springs 53 presses the bush in an axial direction towards the imaginary centre axis of the saw blade. The inner edge 45 of the flange 44 on each one of the lower support rollers 40, 41 is thus pressed against the inner edge 25 of the groove 24 in the saw blade 8. This results in its turn in the saw blade 8 being pressed with its inner rim portion 14 into the groove 33 in the drive pulley 30. Through the wedge action between the bevelled surfaces 22 on the saw blade 8 and the bevelled surfaces 38 in the outer zone 37 of the groove 33 normal forces working against the said second bevelled surfaces 38 are developed which are very large through the wedge action. In this manner a very effective friction grip is achieved between the said first and second drive surfaces 22 and 38, respectively, without the exertion of force by the force-exerting system, i.e. the sleeve 55 and the sleeve nut 56, needing to be particularly great. Otherwise the arrangement shown functions in the same way as the arrangement which is described in U.S. Pat. No. 4,472.880. The saw blade 8 is thus firmly held between the lower support rollers 40, 41 and the upper support rollers 42, 43 working in conjunction with the groove 33, which grips the inner rim portion 14 of the saw blade 8.

Figure 6:
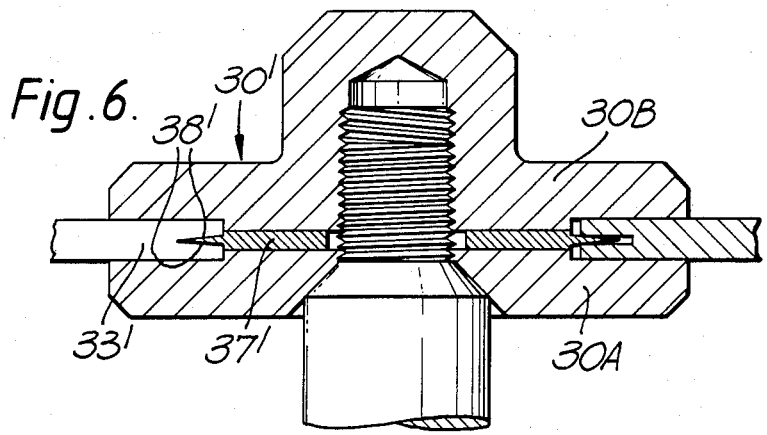
FIG. 6 illustrates another embodiment of the invention.
Figure 7:
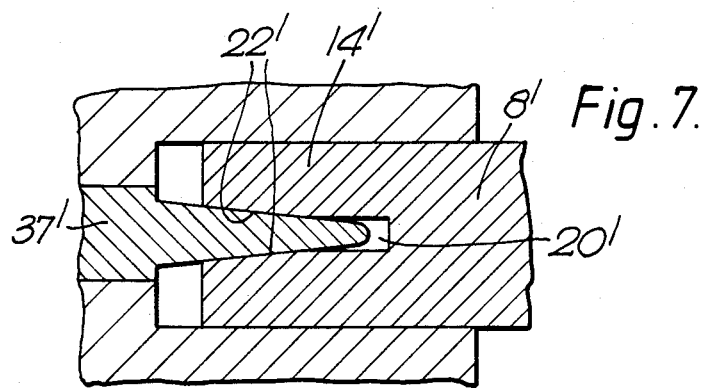
FIG. 7 shows a detail in FIG. 6 on a larger scale.

In FIG. 6 and FIG. 7 a modified embodiment is illustrated. According to this embodiment the sides of the groove 33' in the drive pulley 30' are straight the whole way. Instead there is at the bottom of the groove 33' a ring 37' with wedge-shaped section. The sides 38' of this ring in its wedge-shaped outer part form in this case the second drive conjunction with bevelled surfaces 22' in a groove 20' in the inner rim portion 14' of the saw blade 8'. The ring 37' can for example be made of cemented metal carbide and tightly secured between a lower and an upper pulley member 30A and 30B, wherein the part 30A, the ring 37' and the part 30B together form the drive pulley 30'.

I claim:

1. Circular saw with an annular blade (8), known as an annular saw, with a power unit (2) comprising a motor housing with motor, elements to hold the saw blade in place in the power unit and a transmission system to transmit the motor drive moment to the saw blade, with the saw blade having a plane of symmetry (19) substantially perpendicular to the imaginary centre axis, an inner rim section (14) with first drive surfaces (22), an outer rim section (15) with a cutting system and between them a web portion (16) exhibiting a smooth underside (17) and a smooth topside (18), and these sides (17, 18) are parallel to the said plane of symmetry (19), at least one annular groove (24) is provided in at least one of the aforementioned sides, and with the said holding elements including at least two lower support rollers (40, 41), each one with a surface of rotation (46, 47) bearing upon the smooth underside and at least two upper support rollers (42, 43) each with a surface of rotation (61, 62) bearing upon the smooth topside (18) of the web portion of the saw blade, and also on at least two of the said lower and upper support rollers at least one flange (44) which is limited in the axial direction of the roller by an annular outer flange edge and an annular inner flange edge (45), said flange having a flange thickness (b) which is less than the width (B) of the groove in the web portion of the saw blade and a flange height (h) which is less than the depth (D) of the groove in which the flange is fitted, said transmission system comprising a drive pulley (30) fitted substantially on the inside of the inner rim of the saw blade with an axis of rotation (31) located between the inner rim of the saw blade and the said centre axis, parallel to the centre axis, and transmission means to transmit the motor torque to the drive pulley, which drive pulley comprises second drive surfaces (38) linking with the said first drive surfaces (22) on the inner rim section of the saw blade so as to transmit, on rotation of the drive pulley, the torque of the drive pulley to the saw blade through a friction coupling between the said first and second drive surfaces (22, 38) so that this rotates around its imaginary centre axis, characterised by force-exerting members (53, 56, 57) provided to work on the support rollers (40, 41), which have at least one flange (44) in engagement with a groove in the web portion of the saw blade, said force-exerting members working essentially in the axial direction of the support rollers, essentially parallel to the plane of symmetry of the saw blade, towards the centre of the saw blade, so that the said first and second drive surfaces are pressed toward each other and so that the said inner edge of the flange on the said flange on the support rollers is pressed against said inner edge of said groove in the web portion of the saw blade.

2. Circular saw as per claim 1, characterised by the fact that the said second drive surfaces (38) are constituted by bevelled surfaces in a groove (33) in the drive pulley.

3. Circular saw as per claim 3, characterised by the fact that the bevelled surfades (38) in the groove in the drive pulley are arranged in an outer zone (37) in the groove, that the groove inside this outer zone exhibits an inner zone (35) with smooth, parallel walls (36), and that the inner rim of the saw blade has a corresponding form.

4. Circular saw as per claim 1, characterised by the fact that the said second drive surfaces (38') are constituted by bevelled surfaces on a raised portion at the bottom of a groove (33') in the drive pulley and that the said first drive surfaces (22') are constituted by bevelled surfaces in a groove (20') in the inner rim portion (14') of the saw blade.

* * * * *